No. 740,628. Patented October 6, 1903.

UNITED STATES PATENT OFFICE.

JÜRGEN CALLSEN, OF ELBERFELD, GERMANY, ASSIGNOR TO FARBEN-FABRIKEN OF ELBERFELD CO., OF NEW YORK, N. Y., A CORPORATION OF NEW YORK.

ALKYLOXYALKYLIDEN ESTERS OF SALICYLIC ACID.

SPECIFICATION forming part of Letters Patent No. 740,628, dated October 6, 1903.

Application filed July 3, 1903. Serial No. 164,244. (No specimens.)

*To all whom it may concern:*

Be it known that I, JÜRGEN CALLSEN, doctor of philosophy, chemist, residing at Elberfeld, Germany, (assignor to the FARBENFABRIKEN OF ELBERFELD COMPANY, of New York,) have invented a new and useful Improvement in Alkyloxyalkyliden Esters of Salicylic Acid, of which the following is a specification.

My invention relates to the production of new pharmaceutical products which are chemically alkyloxyalkyliden esters of salicylic acid having the following general formula—

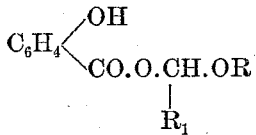

(R and R₁ meaning either the same or two different alkyl radicals, such as methyl, ethyl, propyl, or the like,) and which according to my researches possess valuable therapeutic properties, being good remedies against rheumatism, an average dose being between three and ten grains for external application.

The process for producing my new compounds consists in treating salts of salicylic acid with alpha-halogendialkyl ethers having the following general formula—

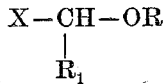

(X meaning a halogen atom, R and R₁ meaning either the same or two different alkyl radicals.) The new products thus produced are from colorless to yellowish liquids soluble in ether, alcohol, chloroform, and benzene. Their alcoholic solutions are colored violet by ferric chlorid.

In carrying out my process practically I can proceed as follows, the parts being by weight: 10.85 parts of alpha-monochlorodiethyl ether having the formula—

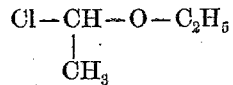

(See *Annalen der Chemie*, Vol. 108, p. 226.) are added little by little to sixteen parts of dry sodium salicylate while carefully cooling. After the reaction is completed the mixture is washed with ice-water and a dilute solution of sodium carbonate in order to remove the sodium chlorid and the excess of salicylic acid contained therein, and subsequently dried over chlorid of calcium.

The new ethoxyethylidensalicylate of the formula—

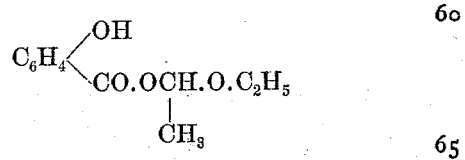

is a yellowish oil having a faint aromatic odor. When treated with water, dilute acids, or alkalies, it breaks up into salicylic acid, acetaldehyde, and ethyl alcohol.

The process proceeds in an analogous manner if other alpha-halogendialkyl ethers—such as alpha-monochloroethylmethylether, alpha-monochloroamylmethylether, or the like—are employed. Of course instead of sodium salicylate other salicylates can also be used.

Having now described my invention and in what manner the same is to be performed, what I claim as new, and desire to secure by Letters Patent, is—

1. The herein-described new alkyloxyalkyliden esters of salicylic acid being from colorless to yellowish liquids soluble in ether, alcohol, chloroform and benzene, the alcoholic solutions being colored violet by ferric chlorid and exhibiting valuable therapeutic properties, substantially as hereinbefore described.

2. The herein-described new ethoxyethyliden ester of salicylic acid being a yellowish oil, breaking up into salicylic acid, acetaldehyde and ethyl alcohol when reacted upon by dilute acids, and exhibiting valuable therapeutic properties, substantially as hereinbefore described.

In testimony whereof I have signed my name in the presence of two subscribing witnesses.

JÜRGEN CALLSEN.

Witnesses:
OTTO KÖNIG,
J. A. RITTERSHAUS.